(12) United States Patent
Najt et al.

(10) Patent No.: US 8,616,162 B2
(45) Date of Patent: Dec. 31, 2013

(54) OPPOSED FREE PISTON LINEAR ALTERNATOR

(75) Inventors: Paul M. Najt, Bloomfield Hills, MI (US); Russell P. Durrett, Bloomfield Hills, MI (US); Venkatesh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 13/277,308

(22) Filed: Oct. 20, 2011

(65) Prior Publication Data

US 2012/0112468 A1   May 10, 2012

Related U.S. Application Data

(60) Provisional application No. 61/410,340, filed on Nov. 4, 2010.

(51) Int. Cl.
*F02B 71/00* (2006.01)

(52) U.S. Cl.
USPC ..... 123/46 E; 123/46 R; 123/46 A; 123/46 B; 123/46 SC; 123/46 H

(58) Field of Classification Search
USPC .................... 123/46 E, 46 R–46 H
See application file for complete search history.

(56) References Cited

U.S. PATENT DOCUMENTS

| | | | |
|---|---|---|---|
| 2,355,924 A | 8/1944 | Pescara | |
| 3,234,395 A | 2/1966 | Colgate | |
| 5,775,273 A * | 7/1998 | Beale | 123/46 B |
| 5,829,393 A * | 11/1998 | Achten et al. | 123/46 A |
| 6,035,637 A * | 3/2000 | Beale et al. | 60/595 |
| 6,554,585 B1 * | 4/2003 | Maracchi | 417/364 |
| 7,082,909 B2 * | 8/2006 | Graf et al. | 123/46 E |
| 2005/0284426 A1 * | 12/2005 | Tusinean | 123/46 R |

FOREIGN PATENT DOCUMENTS

DE         27 13 548 A1   10/1978
DE    10 2008 053 069 A1    5/2010

OTHER PUBLICATIONS

U.S. Appl. No. 13/277,299, Durrett et al.
U.S. Appl. No. 13/277,321, Durrett et al.

* cited by examiner

*Primary Examiner* — Marguerite McMahon
*Assistant Examiner* — James Kim

(57) ABSTRACT

A free piston linear alternator includes a cylinder having a pair of bounce chambers, a pair of scavenging chambers, a pair of opposed pistons and a combustion chamber disposed between the opposed pistons. The pistons are axially opposed from each other and generate electric current when each of the pistons linearly translate. Each of the bounce chambers is disposed between respective ones of the pistons and a respective outer end of the cylinder and includes substantially constrained air configured to return respective ones of the pistons to a respective first position from a respective second position after combustion.

19 Claims, 2 Drawing Sheets

OPPOSED FREE PISTON LINEAR ALTERNATOR

CROSS REFERENCE TO RELATED APPLICATIONS

This application claims the benefit of U.S. Provisional Application No. 61/410,340, filed on Nov. 4, 2010, which is incorporated herein by reference.

TECHNICAL FIELD

This disclosure is related to linear alternators utilizing opposed free pistons.

BACKGROUND

The statements in this section merely provide background information related to the present disclosure. Accordingly, such statements are not intended to constitute an admission of prior art.

An alternator is a device that translates a mechanical input into an electrical current. It is known, for example, to utilize a belt driven shaft to provide an input to the alternator. Alternators utilize induction to generate electricity. It is known, for example, to generate electric current utilizing relative motion between permanent magnets and windings (i.e., coils) of electrically conductive wire to generate current. Different numbers of configurations of magnets and windings are utilized to different effect upon the generated current.

An exemplary linear alternator includes a stationary cylinder and a translating piston within the cylinder. By positioning a magnet or magnets upon one of a wall of the cylinder and the piston and the windings upon the other of the cylinder wall and the piston, linear translation of the pistons creates induction and a resulting flow of current from the windings.

An opposed piston engine includes a combustion chamber disposed between two pistons. As combustion occurs within the combustion chamber, the pistons are driven outward. The pistons are subsequently returned toward the center of the device in preparation for the next combustion event. Exemplary embodiments of an opposed piston engine include free piston engines not having a crankshaft attached to the pistons.

SUMMARY

A free piston linear alternator includes a cylinder having a pair of bounce chambers, a pair of scavenging chambers, a pair of opposed pistons and a combustion chamber disposed between the opposed pistons. The pistons are axially opposed from each other and generate electric current when each of the pistons linearly translate. Each of the bounce chambers is disposed between respective ones of the pistons and a respective outer end of the cylinder and includes substantially constrained air configured to return respective ones of the pistons to a respective first position from a respective second position after combustion.

BRIEF DESCRIPTION OF THE DRAWINGS

One or more embodiments will now be described, by way of example, with reference to the accompanying drawings, in which.

DETAILED DESCRIPTION

Figure 1:
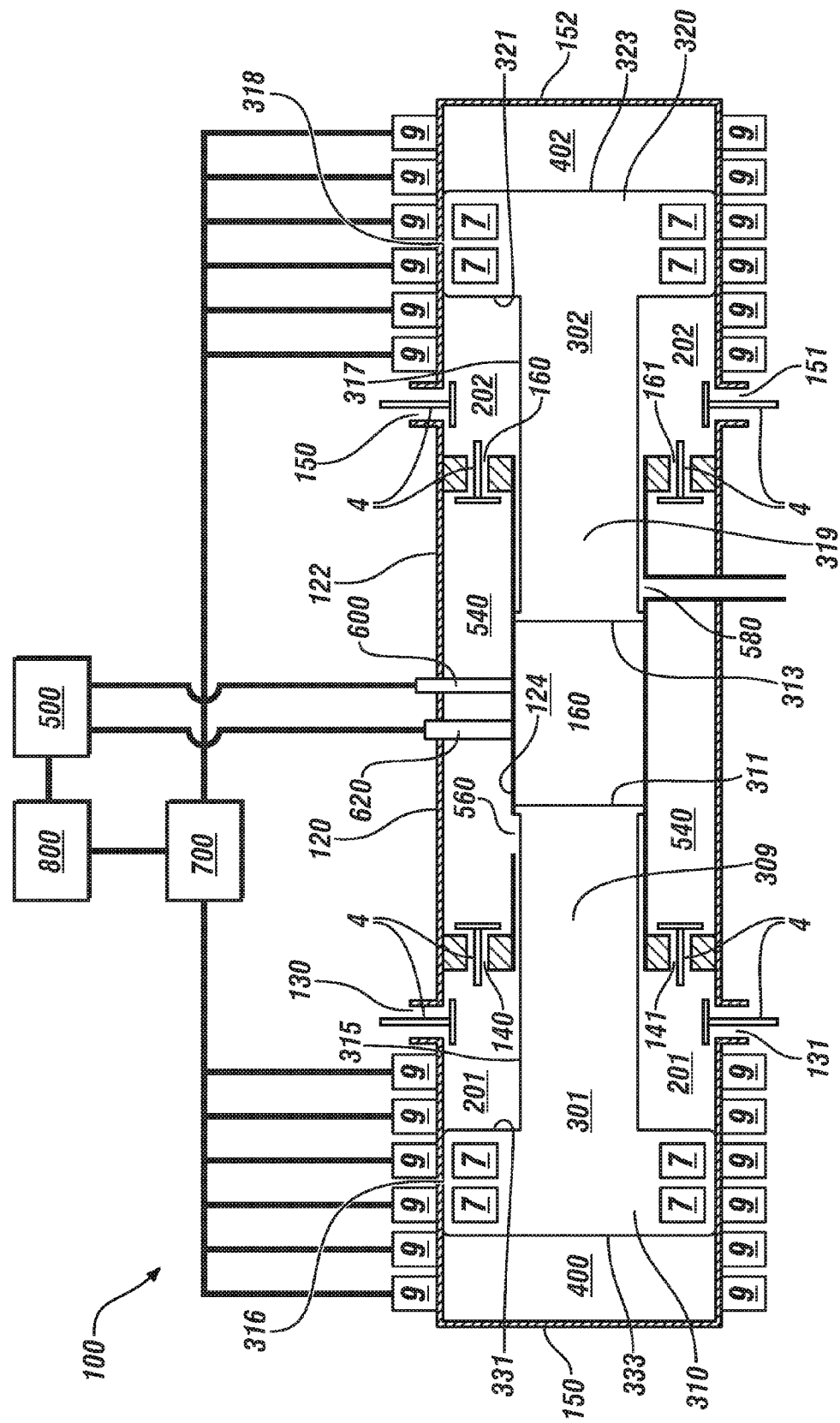
FIG. 1 illustrates a partial sectional view through an exemplary free piston linear alternator utilizing opposed pistons with bounce chambers, in accordance with the present disclosure.

Referring now to the drawings, wherein the showings are for the purpose of illustrating certain exemplary embodiments only and not for the purpose of limiting the same, FIG. 1 illustrates a partial sectional view through an exemplary free piston linear alternator (FPLA) 100 that includes a cylinder 120 including first and second bounce chambers 400, 402, respectively, first and second scavenging chambers 201, 202, respectively, first and second opposed pistons 301,302, respectively, and a combustion chamber 160 disposed between the opposed pistons 301,302. The pistons 301,302 are axially opposed from each other and are configured to generate electric current when each of the pistons 301,302 linearly translate. Each of the bounce chambers 400,402 are disposed between respective ones of the pistons 301,302 and a respective closed outer end 150,152 of the cylinder 120. The bounce chambers 400,402 each include substantially constrained air configured to return respective ones of the pistons 301,302 to a first position (e.g., inner dead center) from a second position (e.g., outer dead center) after a combustion event within the combustion chamber 160. The bounce chambers 400,402 can further be referred to herein as gas springs.

The combustion event within the combustion chamber 160 occurs in a two stroke cycle and said linear translation of each piston 301,302 includes a first stroke of each piston from the first position to the second position driven by said combustion event and a second stroke of each piston 301,302 from the second position to the first position in preparation for a subsequent combustion event. The second stroke utilizes stored energy within the bounce chambers 400,402 to force and return each respective piston 301,302 from the second position to the first position.

Figure 2:
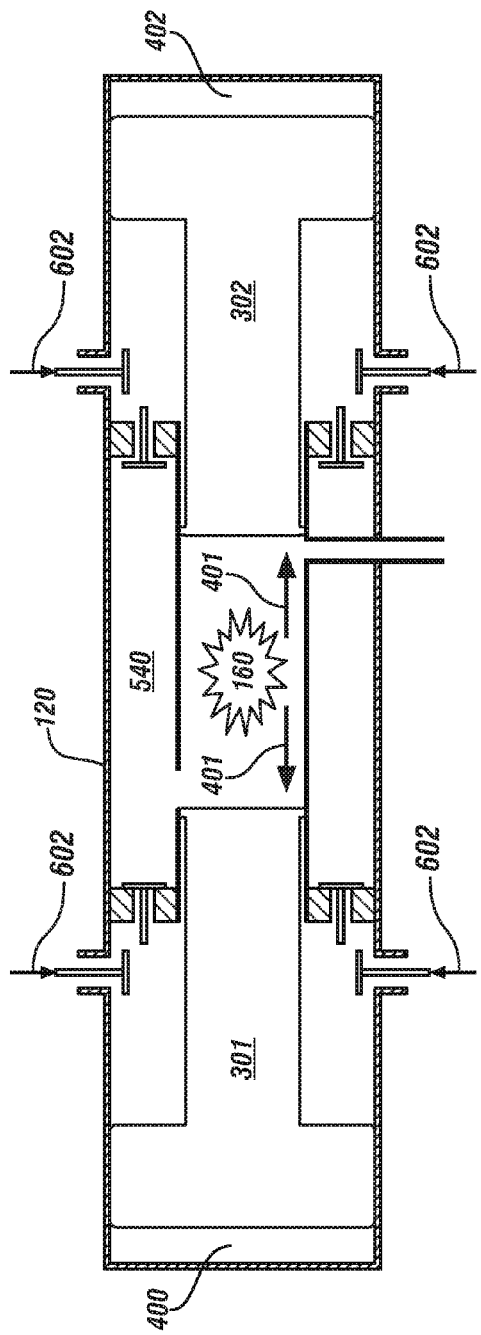
FIG. 2 illustrates the free piston linear alternator of FIG. 1 during a first stroke of the pistons driven by a combustion event from a first position toward a second position in accordance with the present disclosure.

Referring to FIG. 2, each piston 301,302 translating towards the second position during the first stroke is illustrated in accordance with an exemplary embodiment of the present disclosure. The pistons 301,302 driven by a combustion event translate toward the second position. Each of the pistons 301,302 are driven by a combustion driving force 401 resulting from the combustion event. The second position of each of the pistons 301,302 corresponds to an outer dead center position. During the first stroke, the substantially constrained air within each of the bounce chambers 400,402 is compressed when each piston translates from the first position to the second position driven by said combustion event.

Figure 3:
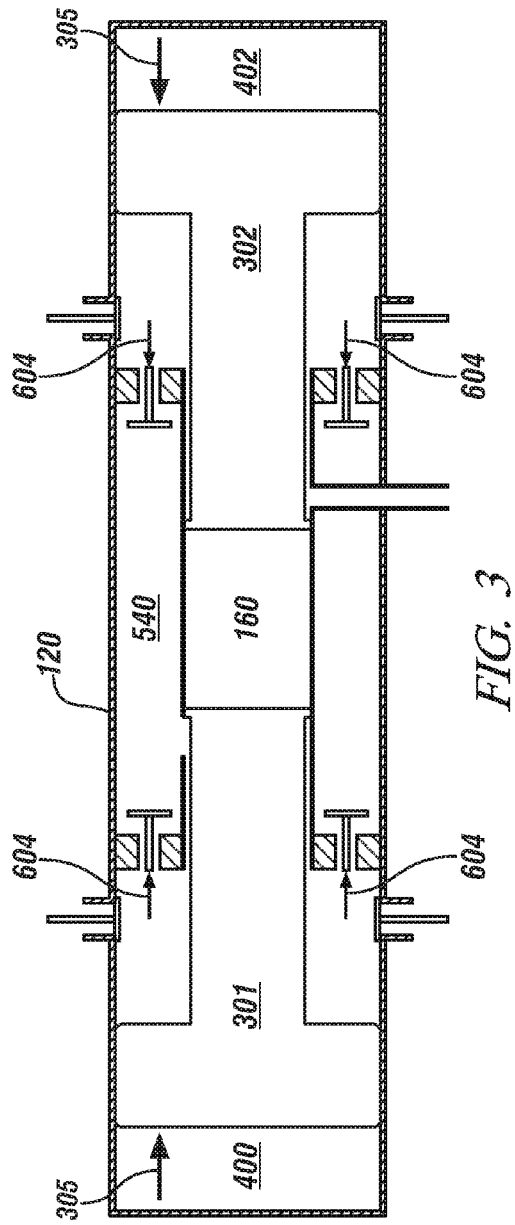
FIG. 3 illustrates the free piston linear alternator of FIG. 1 during a second stroke of the pistons returned by a return force provided by compression within respective bounce chambers toward a first position from a second position in accordance with the present disclosure.

Referring to FIG. 3, each of the pistons 301,302 translating towards the first position during the second stroke is illustrated in accordance with an exemplary embodiment of the present disclosure. The translation or piston return from the second position to the first position during the second stroke is achieved by a return force 305 provided by compression within respective bounce chambers 400,402. In other words, the compressed substantially constrained air within each of the bounce chambers 400,402 is utilized to exert the return force 305 on each respective piston 301,302 to return each respective piston 301,302 to the first position from the second position. Each of the pistons 301,302 can be free pistons, therefore, each of the pistons are not connected to a crankshaft. The first position of each piston 301,302 can correspond to an inner dead center position (i.e., first position), where the inner dead center position is a natural resting position when the substantially constrained air within each respective bounce chamber 400,402 is not compressed.

As illustrated in FIG. 1, the pair of opposed pistons 301, 302 each have a respective head portion 310,320 and a respective slide portion 309,319. The combustion chamber is disposed between proximate ends 311,313 of the respective slide portions 309,319, respectively. The first scavenging chamber 201 is disposed between a cylinder outer wall 122, an outer wall 315 of the slide portion 309 of the first piston 301 and a proximate end 331 of the head portion 310 of the first piston 301. The head portion 310 of the first piston 301 having the proximate end 331 adjacent to the first scavenging chamber 201 and a distal end 333 adjacent to the first bounce chamber 400 can thereby form a seat between the first scavenging chamber 201 and the first bounce chamber 400. Similarly, the second scavenging chamber 202 is disposed between the cylinder outer wall 122, an outer wall 317 of the slide portion 319 of the second piston 302 and a proximate end 321 of the head portion 320 of the second piston 302. The head portion 320 of the second piston 302 having the proximate end 321 adjacent to the second scavenging chamber 202 and a distal end 323 adjacent to the second bounce chamber 402 can thereby form a seat between the second scavenging chamber 202 and the second bounce chamber 402. Hence, each scavenging chamber 201,202 is disposed between a cylinder wall 122, a respective outer wall 315,317 of the respective slide portion 309,319 of each respective piston 301,302 and a respective proximate end 331,321 of the respective head portion 310,320 of each respective piston 301,302. The head portion 310,320 of each respective piston 301,302 having the respective proximate end 331,321 adjacent to the respective scavenging chamber 201,202 and a respective distal end 333, 323 adjacent to the respective bounce chamber 400,402 thereby forming a seat between respective ones of the scavenging chambers 201,202 and respective ones of the bounce chambers 400,402.

Each scavenging chamber 201,202 includes at least one respective inlet port 130,131,150,151, for receiving and channeling intake air into the respective scavenging chambers 201,202. Each scavenging chamber 201,202 includes at least one respective outlet port 140,141,160,161 for delivering the intake air for eventual combustion within the combustion chamber 160. The inlet and outlet ports can each include a check valve 4 configured to allow intake air into each scavenging chamber 201,202 and configured to deliver the intake air out of each scavenging chamber 201,202.

Referring to FIGS. 1 and 2, the first scavenging chamber 201 draws intake air 602 through at least one respective scavenging inlet port 130 and/or 131 when the first piston 301 translates from the first position to the second position during the first stroke. Similarly, the second scavenging chamber 202 draws intake air 602 through at least one respective scavenging inlet port 150 and/or 151 when the second piston 302 translates from the first position to the second position during the first stroke. In one embodiment, the drawn intake air 602 into the first and second scavenging chambers 201,202 can be naturally aspirated ambient air. In another embodiment, the intake air 602 can be charged with a turbocharger or a supercharger to increase the pressure of the intake air and provide a boost pressure to the engine, thereby increasing the output that can be achieved by the FPLA 100. Charged intake air can be cooled by a charge air cooler to increase the density of the air.

With reference to FIGS. 1 and 3, the first scavenging chamber 201 delivers the intake (e.g., delivered intake air 604) through at least one respective scavenging outlet port 140,141 for eventual combustion within the combustion chamber 160 when the first piston 301 translates from the second position to the first position during the second stroke. Similarly, the second scavenging chamber 202 delivers the drawn intake air (e.g., delivered intake air 604) through at least one respective scavenging outlet port 160,161 for eventual combustion within the combustion chamber 160 when the second piston 302 translates from the second position to the first position during the second stroke.

In an exemplary embodiment with reference to FIGS. 1-3, each scavenging chamber 201,202 delivers or pumps the drawn intake air through at least one scavenging outlet port 140,141,160,161 into a reservoir chamber 540 when each of the pistons translate from the second position to the first position. The reservoir chamber 540 fluidly coupling each scavenging chamber 201,202 to at least one combustion chamber inlet port 560 of the combustion chamber 160. The delivered intake air 604 within the reservoir chamber 540 can be drawn into the combustion chamber 160 as supercharged air during a scavenging period when the pistons are in the second position. The scavenging period provides supercharged air from the each scavenging chamber 201,202 to the combustion chamber 160 via the reservoir chamber 540 when the pistons 301,302 are in the second position. This disclosure is not limited to a single reservoir chamber 540 and could include more than one reservoir chamber. In an alternative embodiment, an intake manifold fluidly coupling each of the scavenging chambers 201,202 to the combustion chamber 160 could be utilized in place of the reservoir chamber 540.

It will be understood that the action of the pistons 301,302 provides for expulsion of exhaust gases and intake of charge air. The scavenging configuration where fresh intake air 602 is drawn into the scavenging chambers 201,202 can permit cooling of the pistons 301,302 described herein, and then the air is subsequently drawn into the combustion chamber 160 via the reservoir 540 as charge air. The pistons 301,302 can be configured to compress the drawn intake air 602 within each respective scavenging chamber 201,202 when the pistons 301,302 are returned or forced inward during the second stroke by the return force 305, and thereby acting as a supercharger. Hence, and with reference to FIG. 3, each scavenging chamber 201,202 delivers or pumps the intake air (e.g., delivered intake air 604) through at least one respective scavenging outlet port 140,141,160,161 into the reservoir chamber 540. It will be understood that the compressed delivered intake air 604 within the reservoir chamber 540 is at a pressure higher than the pressure of the intake air that was drawn into each of the scavenging chambers 201,202 during the previous first stroke.

The FPLA 100 includes one or more fuel injectors 600. In an engine configured to operate through direct injection, a fuel injector 600 is supplied with high pressure fuel through a fuel rail or other device. In a direct injection engine, the fuel is sprayed directly into the combustion chamber 160. Other configurations are known wherein fuel can be injected into intake port or ports and drawn into the combustion chamber 160 with the intake air. For instance, fuel could be injected at the combustion chamber inlet port 560 or at some location within the reservoir chamber 540. Fuel injectors are configured to spray or atomize the fuel in order to facilitate efficient mixing and combustion of the fuel within the combustion chamber 160.

The combustion chamber 160 includes one or more inlet ports 560. The combustion chamber 160 further includes one or more exhaust ports 580. Generally, intake ports channel charged air (e.g., intake air) by translating pistons to supercharge, compress and deliver intake air within each of the scavenging chambers 201,202, into the combustion chamber 160 via the reservoir chamber 540. Exhaust ports receive exhaust from the combustion chamber 160 after a combustion event and channel the exhaust into an exhaust system, for example, through an exhaust manifold.

The combustion chamber 160 illustrated in FIG. 1 is defined by an inner wall 124 of the cylinder 120 and each of the respective proximate ends 311,313 of the slide portions 309,319 of each of the respective pistons 301,303. Each of the slide portions 309,319 may include a respective plug portion located on the respective proximate ends 311,313 that separates the combustion chamber 160 from the rest of the region within the cylinder 120. In other words, each of the plug portions function as a sealing surface for combustion events within the combustion chamber 160. Intake air (e.g., charge air) is drawn into the combustion chamber 160 from the reservoir chamber 540 during the scavenging period when the pistons 301,302 are in the second position. In an exemplary embodiment fuel is injected into the combustion chamber 160. Alternatively, fuel can be injected at the combustion chamber inlet port 560 or at a location within the reservoir chamber 540. Subsequently, the fuel air charge is compressed by the returning of the pistons 301,302 provided by the return force 305 exerted by the compressed substantially constrained air within each of the bounce chambers 400,402 (i.e., FIG. 3). The FPLA 100 is configured such that combustion occurs when the fuel air charge is compressed. In an exemplary embodiment of the present disclosure, leakage from either of the slide portions 309,319 can be scavenged into respective ones of the scavenging chambers 201,202, or the reservoir chamber 540, and subsequently drawn into the combustion chamber 160.

A number of combustion modes are known in the art, and the FPLA 100 is envisioned to utilize any number of combustion modes. The FPLA can be configured to utilize diesel fuel for combustion. Combustion of diesel fuel can be controlled through compression ignition, where the fuel-air charge is compressed to a point wherein the charge ignites without a spark. Such configurations are known to additionally include a glow plug to assist in conditions wherein temperatures or other factors might make misfires or partial combustion of the charge possible. Additionally, diesel engines are known to utilize a premixed charge compression ignition mode (PCCI) including a high ratio of charge air to fuel or lean operation that can increase fuel economy of the engine. Alternatively, other fuels and engine configurations can be utilized including gasoline and ethanol blend fuels. As depicted in FIG. 1, such a configuration can include a spark plug 620 to provide spark at a particular timing to ignite the charge. Additionally, combustion modes are known including a stratified charge spark ignition mode and a homogeneous charge compression ignition (HCCI) mode. Stratified charge spark ignition mode can use a concentration of fuel within a particular portion of the combustion chamber 160 in combination with a timed spark from the spark plug to provide efficient combustion and force to the piston. HCCI mode includes operation with a high ratio of charge air to fuel or lean operation that can increase fuel economy of the engine. A number of fuels and combustion modes can be utilized within the engine. This disclosure is not intended to be limited to the particular exemplary embodiments provided herein.

An exhaust system receives exhaust gas from the exhaust port 580 or ports as an exhaust gas flow. The exhaust gas flow is characterized by an exhaust gas temperature, an exhaust gas pressure, and an exhaust gas mass flow rate. The exhaust gas flow can be directly expelled from the exhaust system to the ambient air. In another embodiment, an aftertreatment device or devices can be used to treat constituents that can be in the exhaust gas flow, including NOx, CO, and trace hydrocarbons. The exhaust gas flow can be additionally utilized in a turbomachine to transform pressure in the exhaust gas flow into mechanical energy.

As aforementioned, the pair of opposed pistons 301,302 generate electric current during each of the first and second strokes. The pistons 301,302 of the FPLA 100 includes a first element 7 interacting with a second element 9 located on the outer wall 122 of the cylinder 120 where translation of each piston between the first position and the second position generates the electric current. It will be understood that translation of each piston between the first position and the second position also includes translation between the second position and the first position generating the electric current. In an exemplary embodiment of the present disclosure, the first element 7 is located on the head portion 310,320 of each piston 301,302, respectively. In an exemplary embodiment of the present disclosure, and as illustrated in FIG. 1, the first element 7 includes a permanent magnet and the second element 9 includes a winding. The windings include wires emanating from the windings in order to deliver the electric current to an associated rectifier 700. The rectifier 700 is electrically coupled to a battery 800 for storing the generated current. By placing the permanent magnets on the pistons 301,302, no wires need to be attached to the translating pistons. In an alternative embodiment, the first element 7 includes the winding and the second element 9 includes the permanent magnet. In other words, the first element 7 of the FPLA 100 includes one of a permanent magnet and a winding, and the second element 9 of the FPLA 100 includes the other one of the permanent magnet and the winding.

Heat is generated within the combustion chamber 160. Permanent magnets can be adversely affected by high temperatures. As a result, it can be beneficial to configure the piston such that the permanent magnets (i.e., first element 7) are not exposed to high temperatures. Such configuration can take a number of embodiments. For example, as illustrated in FIG. 1, the pistons 301,302 are located to interact with and compress the mass air flow of intake air being drawn into the scavenging chambers 201,202 of the FPLA 100. The aforementioned scavenging configuration can utilize the drawn intake mass airflow into each of the scavenging chambers 201,202 to cool each respective piston 301,302 and the permanent magnets (i.e., first element 7) by the mass airflow through the scavenging chambers 201,202. Features upon the piston can be selected such that heat transfer from the piston to the intake air is maximized. In an exemplary embodiment of the present disclosure, the respective outer wall 316,318 of the respective head portion 310,320 of each respective piston 301,302 is substantially thin maximizing heat transfer from the first element 7 (e.g., permanent magnet). In another exemplary embodiment, each piston 301,302 is substantially hollow maximizing heat transfer from the first element 7 and reducing mass of each of the pistons 301,302. In another exemplary embodiment, heat transfer through each of the pistons 301,302 can be maximized or facilitated utilizing a series of fins coupled to the respective distal ends 321,331 of the respective pistons 301,302 interacting with the drawn intake air within each of the scavenging chambers 201,202. Further, engine coolant or other fluids can be used in a heat exchanger design jacketed around the FPLA 100 for additional heat transfer away from the FPLA 100. Further, materials for the pistons can be selected to impact the heat transfer properties of each of the pistons 301,302. In an exemplary embodiment, steel can be utilized. In an alternative embodiment, aluminum can be utilized. In another alternative embodiment, a ceramic material can be utilized that reduces the amount of heat that is transferred from the combustion chamber 160 to the first element 7 (e.g., permanent magnets). It will be understood that a number of different materials can be utilized, and the disclosure is not intended to be limited to the particular exemplary embodiments disclosed herein.

Free piston engines do not include high magnitude lateral forces within the combustion chamber 160 as when a piston is connected to a crankshaft. As a result, certain embodiments of piston designs can be utilized that do not require seals or piston rings between the pistons 301,302 and the inner and outer cylinder walls 124,122. Such embodiments additionally reduce the heat generated within the FPLA and can reduce the temperatures experienced by the permanent magnets.

Piston mass can affect operation of the FPLA 100. For instance, the combustion force 401 required to drive each of the pistons 301,302 and oscillation frequencies within the pistons 301,302 are affected by piston mass. Likewise, the return force 305 required to return each piston to inner dead center (e.g., the first position) is affected by piston mass.

As aforementioned, the electric current generated within the FPLA is created within the windings (i.e., second element 9) illustrated in FIG. 1. The wires illustrated in FIG. 1 transmit the electric current to the rectifier 700. The electric current generated within the FPLA 100 is generated as an alternating current. The rectifier 700 can be utilized to transform the electric current from alternating current to direct current and thereby stored as energy within the battery 800.

In an exemplary embodiment of the present disclosure, a compression ratio within the combustion chamber 160 can be affected by adjusting the return force 305 provided by the compressed substantially constrained air within the bounce chambers 400,402. In one exemplary embodiment, the return force 305 can be adjusted or modulated by varying a mass of constrained air (i.e., constrained air mass) within at least one of the bounce chambers 400,402. In one embodiment, adjusting the constrained air mass within at least one of the bounce chambers 400,402 can include increasing air into the respective bounce chamber 400,402. In another embodiment, adjusting the constrained air mass within at least one of the bounce chambers 400,402 can include releasing a portion of the substantially constrained air out of the respective bounce chamber 400,402.

In another exemplary embodiment, a phasing of the linear translation of at least one of the pistons 301,302 can be adjusted in accordance with affecting the compression ratio within the combustion chamber 160 by the adjusting the return force 305 by varying the constrained air mass within at least one of the bounce chambers 400,402.

A control module 500 or modules are utilized to control various portions of the FPLA. A control module 500 can control a fuel flow rate into the combustion chamber 160, affecting the output of the FPLA. A control module 500 can increase or decrease electrical resistance applied to the electric circuit, thereby affecting how much current is drawn from the FPLA. Such a modulation of the current drawn from the FPLA can affect the electric power that is delivered to the rectifier 700. Further, modulation of the current drawn from the FPLA can modulate the force created by induction upon the pistons 301,302, thereby affecting the cycling of the pistons 301,302 and combustion within the combustion chamber 160. For example, the combustion force 401 and the biasing force 305 applied to the pistons can affect the compression ratio within the combustion chamber 160.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The FPLA 100 as described herein can be utilized singly in an exemplary embodiment of the present disclosure. In an alternative embodiment, FPLAs can be utilized in pairs or in banks. Depending upon the overall requirements of the entire configuration, individual FPLAs or groups of FPLAs can be selectively activated or deactivated. Each FPLA can be individually balanced, with opposing pistons operating in equal and opposite translations, so configurations can be utilized that do not require operation of the FPLA s to be maintained in pairs.

The FPLA 100 includes fewer moving parts than other known engine configurations. Further, as described herein, a configuration can be utilized not requiring pistons rings. As a result of fewer moving parts and the elimination of piston rings, heat generation in the FPLA may be reduced and engine efficiency may be increased.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A free piston linear alternator comprising:
a cylinder including a pair of bounce chambers, a pair of scavenging chambers, a pair of opposed pistons and a combustion chamber disposed between the opposed pistons, each of the pistons axially opposed from each other and having a respective slide portion and a respective head portion including a proximate end and a distal end;
the scavenging chambers configured to draw intake air when the pistons linearly translate away from the combustion chamber, each scavenging chamber disposed between an outer wall of the cylinder, an outer wall of the respective slide portion and the proximate end of the respective head portion;
each of the respective head portions of the pistons including a respective first element disposed thereon to maximize heat transfer from the respective first element to the intake air drawn into the adjacent respective scavenging chamber, the respective first element interacting with a respective second element located on the outer wall of the cylinder to generate electric current when each of the pistons linearly translate; and each of the bounce chambers disposed between respective ones of the distal ends of the head portions of the pistons and a respective closed outer end of the cylinder and comprising substantially constrained air configured to return respective ones of the pistons to a respective first position from a respective second position after combustion.

2. The free piston linear alternator of claim 1 wherein said combustion occurs in a two stroke cycle and said linear translation of each piston comprises a respective first stroke of each piston from the respective first position to the respective second position driven by said combustion and a second stroke of each piston from the respective second position to the respective first position in preparation for a subsequent combustion event.

3. The free piston linear alternator of claim 2 wherein the respective first position corresponds to each piston in a respective inner dead center position and said respective second position corresponds to each piston in a respective outer dead center position.

4. The free piston linear alternator of claim 1 wherein each of the opposed pistons comprises a free piston having a natural resting position when the substantially constrained air within the respective bounce chamber is not compressed.

5. The free piston linear alternator of claim 1 wherein the substantially constrained air within each of the bounce chambers is compressed when the corresponding piston translates from the respective first position to the respective second position and said compressed substantially constrained air exerts a return force on the corresponding piston to return the corresponding piston to the respective first position from the respective second position.

6. The free piston linear alternator of claim 1 wherein the translation of each piston between the respective first position and the respective second position generates the electric current.

7. The free piston linear alternator of claim 6 wherein the first elements comprise one of permanent magnets and windings, and the second elements comprise the other one of the permanent magnets and the windings.

8. The free piston linear alternator of claim 1 wherein the combustion chamber is disposed between respective proximate ends of the respective slide portions of the opposed pistons.

9. The free piston linear alternator of claim 8 wherein the respective head portion of each respective piston having the respective proximate end adjacent to the respective scavenging chamber and the respective distal end adjacent to the respective bounce chamber thereby forms a seat between the respective scavenging chamber and the respective bounce chamber.

10. The free piston linear alternator of claim 1 wherein each scavenging chamber draws the intake air through at least one respective scavenging inlet port when the corresponding piston translates from the respective first position to the respective second position, and each scavenging chamber delivers the drawn intake air through at least one respective scavenging outlet port into the combustion chamber when the corresponding piston translates from the respective second position to the respective first position.

11. The free piston linear alternator of claim 10 wherein each scavenging chamber delivers the drawn intake air through the at least one respective scavenging outlet port into a reservoir chamber fluidly coupling each scavenging chamber to the combustion chamber.

12. The free piston linear alternator of claim 10 wherein the drawn intake air comprises one of naturally aspirated ambient air and charged ambient air via one of a turbocharger and a supercharger.

13. The free piston linear alternator of claim 1 wherein a desired compression ratio within the combustion chamber is effected by adjusting a return force provided by the substantially constrained air.

14. The free piston linear alternator of claim 13 wherein adjusting the return force provided by the substantially constrained air comprises one of increasing the constrained air mass within at least one of the bounce chambers and decreasing the constrained air mass within at least one of the bounce chambers.

15. Method for controlling a free piston linear alternator having a cylinder including a pair of scavenging chambers, a pair of opposed, a pair of bounce chambers each disposed between respective ones of the pistons and a respective outer end of the cylinder, and a combustion chamber disposed between the opposed pistons, comprising:

driving each piston outward from a respective inner dead center position to a respective outer dead center position with a combustion event within the combustion chamber, each piston having a respective slide portion and a respective head portion including a proximate end and a distal end;

drawing intake air into the respective scavenging chambers when the pistons translate from the respective inner dead center positions to the respective outer dead center positions, each scavenging chamber disposed between an outer wall of the cylinder, an outer wall of the respective slide portion and the proximate end of the respective head portion;

generating a respective return force within each respective bounce chamber to return each piston inward from the respective outer dead center position to the respective inner dead center position in preparation for a subsequent combustion event; and generating electric current when each piston translates between the respective inner dead center position and the respective outer dead center position, each head portion of the pistons comprising a permanent magnet disposed thereon interacting with a winding of the linear alternator located on a wall of the cylinder to generate the electric current; and cooling each permanent magnet utilizing the drawn intake air within each adjacent respective scavenging chamber.

16. The method of claim 15 wherein generating the respective return force within each respective bounce chamber comprises compressing a substantially constrained air mass within the respective bounce chamber when the respective piston translates from the inner dead center position to the respective outer dead center position.

17. The method of claim 15 further comprising effecting a desired compression ratio within the combustion chamber by adjusting the constrained air mass within at least one of the bounce chambers.

18. The method of claim 15 further comprising:
when the pistons translate from the respective outer dead center positions to the respective inner dead center positions, delivering the drawn intake air from the scavenging chambers into a reservoir chamber; and when the pistons are in the outer dead center position, drawing the intake air within the reservoir chamber into the combustion chamber.

19. A free piston linear alternator comprising:

a cylinder including a pair of pistons having respective head and slide portions including a proximate end and a distal end, each piston axially opposed from the other;

a pair of bounce chambers each disposed between respective distal ends of the head portion of the respective piston and a respective closed outer end of the cylinder, each bounce chamber comprising substantially constrained air;

a combustion chamber disposed between the proximate ends of the slide portions;

a pair of scavenging chambers configured to draw intake air when the pistons linearly translate away from the combustion chamber, each scavenging chamber disposed between an outer wall of the cylinder, an outer wall of the respective slide portion and the proximate end of the respective head portion; and each of the respective head portions of the pistons including a first element of a linear alternator disposed thereon to maximize heat transfer from the respective first element to the intake air drawn into the adjacent respective scavenging chamber, the respective first element interacting with a respective second element located on the outer wall of the cylinder to generate electric current when each of the pistons linearly translate.

\* \* \* \* \*